United States Patent [19]
Beck et al.

[11] Patent Number: 5,554,287
[45] Date of Patent: Sep. 10, 1996

[54] CELLULOSE MATRIX FILTER MATERIAL

[75] Inventors: Dieter Beck, Bad Kreuznach; Peter P. Breitbach, deceased, late of Bretzenheim, by Dorothea Breitbach, Gertrud Breitbach, heirs; Thomas Breitbach, heir, Ingelheim; Rudiger Leibnitz, Bad Kreuznach; Gerd Ritter, Guldental, all of Germany

[73] Assignee: Seitz-Filter-Werke GmbH und Co., Bad Kreuznach, Germany

[21] Appl. No.: 218,323

[22] Filed: Mar. 25, 1994

[30] Foreign Application Priority Data

Mar. 26, 1993 [DE] Germany ............... 43 09 845.2

[51] Int. Cl.⁶ ............... B01D 39/18; B27N 3/04
[52] U.S. Cl. ............... 210/500.29; 210/500.3; 210/500.31; 210/500.32; 210/505; 264/122; 264/DIG. 48
[58] Field of Search ............... 210/500.29, 500.3, 210/500.31, 500.32, 505, 508; 264/DIG. 48, 109, 122

[56] References Cited

U.S. PATENT DOCUMENTS

| | | | |
|---|---|---|---|
| 3,246,767 | 4/1966 | Pall et al. | 210/505 |
| 3,842,007 | 10/1974 | Caputi et al. | 210/490 |
| 3,961,007 | 6/1976 | Caputi et al. | 264/140 |
| 4,192,838 | 3/1980 | Keith et al. | 264/10 |
| 4,274,914 | 6/1981 | Keith et al. | 162/109 |
| 5,114,537 | 5/1992 | Scott et al. | 162/146 |

FOREIGN PATENT DOCUMENTS

| | | |
|---|---|---|
| 4010526 | 10/1990 | Germany . |
| 4119288 | 6/1991 | Germany . |
| 2230278 | 10/1990 | United Kingdom . |
| 9207140 | 4/1992 | WIPO . |

OTHER PUBLICATIONS

Database WPI, Week 8211, Derwent Pub. AN 82–21576E & SU–A–833 283, *Zusammenfassung*, 1 page.
Database WPI, Week 8544, Derwent Pub. AN 85–274333 & RO–A–86 546, *Zusammenfassung*, 1 page.
Database WPI, Week 9416, Derwent Pub. AN 94–132655 & JP–A–6 082 435, *Zusammenfassung*, 1 page.
Database WPI, Week 9416, Derwent. Pub. AN 94–132655 & SU–A–833 283, *Zusammenfassung*, 1 page.

*Primary Examiner*—Robert A. Dawson
*Assistant Examiner*—Kenneth M. Jones
*Attorney, Agent, or Firm*—H. Gibner Lehmann; K. Gibner Lehmann

[57] ABSTRACT

A filter material forming a filter layer consisting substantially exclusively of celluloses and cellulose derivatives. In addition to cellulose acetate fibers, the filter layer contains, in the form of additives, microcrystalline cellulose and microfine cellulose, or else microcrystalline cellulose only. The amount of microcrystalline cellulose can be as high as 70% of the weight of the filter layer and that of microfine cellulose up to 50% of the weight of the filter layer. Cellulose acetate fibers can be excluded if in their place, microcrystalline cellulose having particle sizes less than 10 μm. are used. The manufacturing method provides for cellulose acetate fibers to be first mixed in a wet state with microfine cellulose and microcrystalline cellulose, after which differently prepared celluloses are admixed. The mash formed by mixing is formed into a fleece by means of a known felting method, and the fleece is subsequently dried. With layers of the filter material, filtration efficiencies up to and including a sterilizing range are achieved, which renders them comparable to known kieselguhr layers.

37 Claims, 1 Drawing Sheet

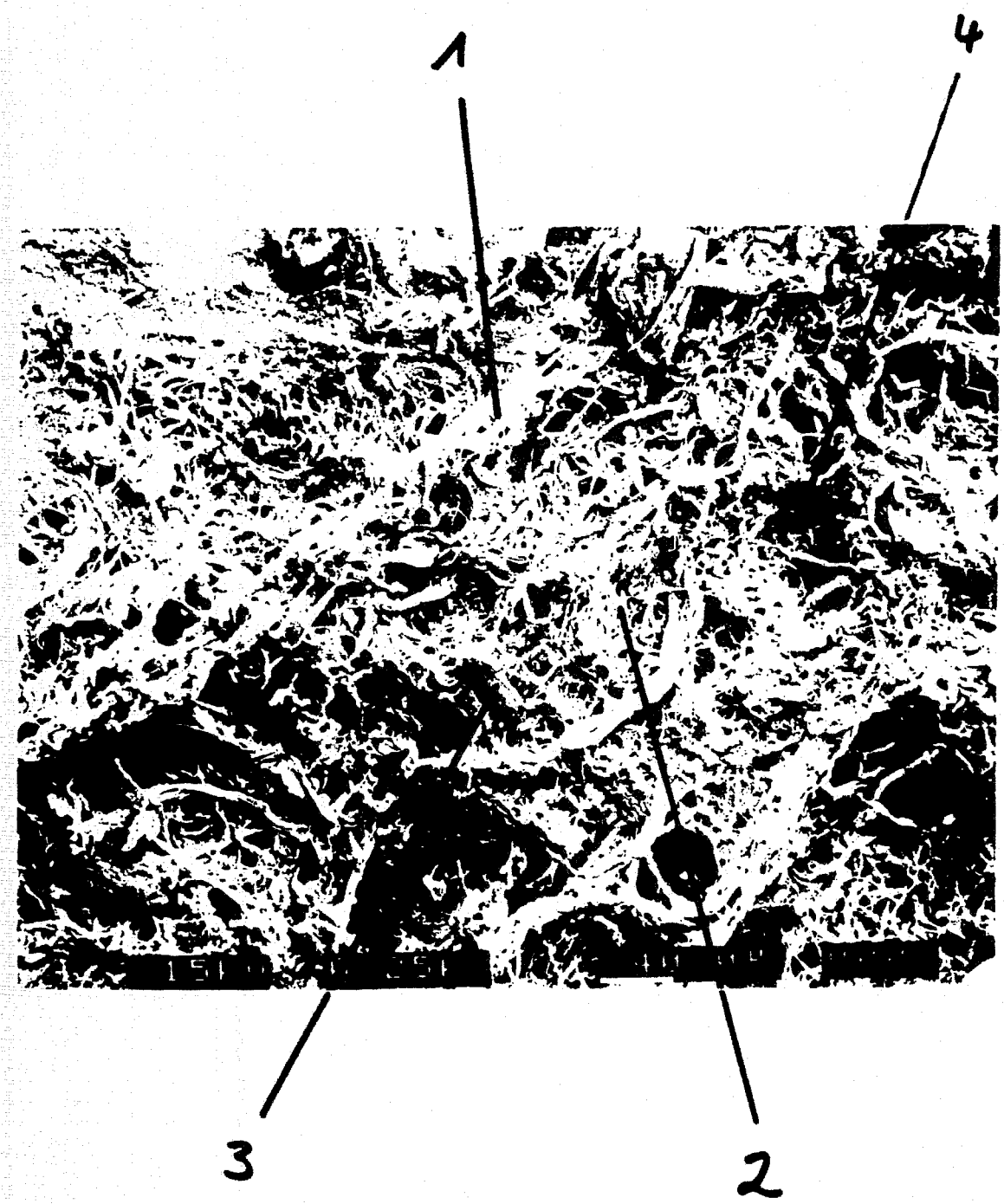

CELLULOSE MATRIX FILTER MATERIAL

CROSS REFERENCES TO RELATED APPLICATIONS

The present application claims priority under 35 USC 119, of German Application No. P 43 09 845.2-27 filed Mar. 26, 1993.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

The invention relates to a filter material, in particular for depth filter layers and pre-coat filters, with cellulose as a matrix material in which cellulose acetate fibers and additives are embedded. The invention also relates to the manufacture of such filter materials.

2. Description of the Related Art Including Information Disclosed Under 37 CFR §§1.97–1.99

Since the use of asbestos fibers in filter layers for depth filtration has been mostly discontinued, kieselguhrs and perlite have gained much importance for use in depth filter layers. Cellulose fibers have also continued to be used as skeleton materials. A number of disadvantages have become apparent due to the fact that kieselguhrs, being inorganic materials, do not readily decompose biologically; also, there exists a health hazard arising out of dust formation from such materials. Furthermore, untreated kieselguhrs tend to wash out ions relatively easily.

Glass fibers which can be produced dimensionwise down to 0.1 μm. disqualify due to their inability to decompose biologically, and their carcinomatous effect. Polypropylene, polyamide and polyester fibers are not yet available in the desired fine fiber sizes, or cannot be separated adequately so that they are not suited as a filtration-active substance, i.e. as a possible kieselguhr substitute.

For the manufacture of depth filter material consisting of cellulose and cellulose derivatives, use of cellulose acetate fibers has been adopted. These fibers, after precipitation, are present in very pure form with respect to extractable components, as compared to kieselguhrs.

In U.S. Pat. Nos. 3,842,007 and 3,961,007 there are described the use of pure cellulose acetate layers for depth filtration. Known from U.S. Pat. No. 3,842,007 is a filter material containing cellulose acetate fibers in the form of rods or flakes, their specific surfaces being between 35 to 55 square meters per gram. The disadvantage of this filter material is that it must be kept in a moist state after manufacture, making it necessary to store it in special containers.

According to U.S. Pat. No. 3,961,007 which relates to a further development of the filter material described in U.S. Pat. No. 3,842,007, still other materials such as kieselguhr or cellulose fibers can be added to the cellulose acetate fibers, this addition being made prior to the precipitation.

These restrictions are not acceptable for filter layers. On the one hand, layers can be sold in moist condition in exceptional cases only; on the other hand, pure cellulose acetate layers are too expensive.

U.S. Pat. Nos. 4,192,838 and 4,274,914 describe the manufacture of very thin filter layers for aerosols, the filters being used primarily as cigarette filters. These filter layers consist exclusively of cellulose ester fibers. Depth filters for hydrosols must have a considerably longer useful life as compared to cigarette filters, and they are subjected to other particle concentrations and sizes so that their structure must deviate greatly from the filter papers mentioned in the above patents to assure a high storage capacity at given separation rates and pressure losses.

U.S. Pat. No. 5,114,537 deals with the manufacture and composition of dry filter layers which can be used in standard filter presses and depth filter cartridges. The layers are composed of 2 to 30 weight percent cellulose acetate, and 98 to 70 weight percent cellulose fibers, which are preferably ground, and composed of a cationic wet strength agent. The separation rates and pressure losses are varied through different grinding times, without the mention of grinding rates and mix ratios. Moreover, the known cellulose acetate fibers are relatively thin, whereas the remaining cellulose is relatively thick. This, and the cross-linking of the cellulose acetate fibers, make it not possible to achieve a homogeneous mixture of the materials.

Although the replacement of cellulose/asbestos layers is claimed in U.S. Pat. No. 5,114,537, the values given for achieved degrees of separation are far below those of commercially available sterilizing filters. For example, a B-value of 28.6 was reached for particle sizes between 1 and 3 μm. For particles between 0.2 and 0.45 μm. the B-value was near 5. By contrast, for sterilizing filters the B-value for 0.3 μm. particles should be 5000.

It becomes clear that, in order to reach commonly used degrees of separation, the clearing or filtering effect must be improved considerably without increasing the pressure losses.

Further, DE-OS 40 10 526 describes a filter material which has a plastic and/or natural fiber basic skeleton in which inert particles are embedded. Mentioned as plastic fibers are cellulose acetate fibers. As to the inert particles, agglomerate particles, preferably precipitated silicic acid with particle sizes up to 100 μm. are mentioned.

Like kieselguhr, precipitated silicic acid consists of inorganic material. Consequently, as in the case of kieselguhr, there are problems, though somewhat less severe due to the different morphology, with respect to its health damaging effects and with respect to the disposal of used layers of this acid-based material.

Known from DE 41 19 288 A1 is a method of layer filtration employing inert filtering aids that emit virtually no metal ions. These filtering aids include fine, highly dispersed polymer granulate, micronized, and/or very pure cellulose materials or mixtures thereof which give off virtually no metal ions instead of the usual, filtration active mineral components such as kieselguhr and perlite.

Micronized cellulose, also called microfine cellulose, is understood to be a material consisting of dry, ground cellulose materials, in particular from deciduous trees, with fiber lengths from 10 to 300 μm., in particular between 10 and 200 μm.

As to the fiber thickness, a mean diameter from 5 to 30 μm. is considered practical, fiber thicknesses and fiber diameters of 15 μm. also being mentioned.

The use of such sizes does not constitute a substitute for kieselguhrs however. Also, no clearing or filtering effects in the sterilizing zone are possible either. In order to achieve these clearing effects, synthetic polymer granulates, in particular urea-formaldehyde condensation products with particle sizes from 0.1 to 3.0 μm. and a specific surface of 20 square meters per gram are used, according to DE 41 19 288 A1. Free formaldehyde contents, which are not entirely avoidable even in products which undergo purification by condensation, cannot be tolerated in many areas of the pharmaceutical and food industries. In addition, this material does not meet the claim of material homogeneity, so important for its disposal.

SUMMARY OF THE INVENTION

Accordingly, the object of the invention is a filter material which consists essentially exclusively of cellulose materials and cellulose derivatives, contains no health endangering or environmentally harmful components, and which attain at least the same high degrees of separation as do the asbestos-free depth filter layers of the state of the art, and which contains very few extractable components.

This problem is solved by the characteristics specified in appended claim 1. Claim 21 constitutes a corresponding manufacturing method.

The reasons for the low degrees of separation achieved so far with cellulose acetate fibers can be found in their structure. While kieselguhrs are dispersed materials with particle sizes as low as the submicrometer range, cellulose acetate fibers form fiber networks, the size of whose agglomerates depends on their preparation.

Due to their disperse character, kieselguhrs are in a position to move within the layer during its formation, also called cake filtration, thus having a homogenizing effect. With relatively high amounts of kieselguhr, up to ⅔ of the total layer mass, the homogeneity of the layer was assured.

The cellulose fibers have no internal pore system, however, and thus do not participate in the separating action. Instead, they only form a matrix and assist in the filter layer's stability, this sometimes being assisted by cationic wet strength agents. The separating action that does occur, however, is achieved by the cross-linking of cellulose acetate fibers, in which process the agglomerates formed by the cellulose acetate fibers are generally too large, so that they are not freely movable when structuring the layer and thus can have no homogenizing effect. Present filter layers are, therefore, characterized by inhomogeneities which can be lessened only in part by intensive mixing during the manufacturing process. During the filtration, the main portion of the suspension flows through those areas in which preferably cellulose fibers are present which, however, have a considerably weaker separating effect. Thus, the separating potential of the cellulose acetate fibers is utilized only incompletely.

According to the invention, these problems can be solved by an addition of up to 70 weight percent share of microcrystalline cellulose and an up to 50 weight percent share of microfine cellulose, there however being provided the possibility to do without the microfine cellulose altogether.

As a rule, cellulose consists of amorphous and crystalline components. When producing microcrystalline cellulose, amorphous components are removed by an acid hydrolysis under the effect of heat so that isolated, even though modified, cellulose crystallites are present in the end product. The crystallinity index moves during this process from 0.5 to 0.6, in the starting cellulose, to about 0.8. The crystallinity index is found roentgenographically by determining the ratio of the sharp crystallite interference surfaces to the total surface. The desired dispersed state is adjusted through a grinding and sifting operation. In accordance with this grinding/sifting operation different fractions are produced which can be differentiated from one another with respect to the particle sizes. In addition, the chain length of the cellulose molecules is reduced by this treatment.

Microcrystalline cellulose as used in this filter material is understood to mean fractions with particle diameters less than 50 μm., the length to diameter ratio of these particles being preferably less than 3:1.

Differing from microcrystalline cellulose, microfine cellulose is produced by grinding and sifting operations only. This means that the crystallinity index is nearly unchanged from that of the starting material (i. e. also 0.5 to 0.6). Due to the absence of chemical treatment, the chain length of the cellulose molecules is longer than that of microcrystalline cellulose.

The microfine cellulose used in accordance with the invention contains cellulose shares with fibers whose length can be as much as 1 mm., but is preferably below 100 μm. In the following, the microcrystalline and the microfine cellulose are characterized respectively by stating their particle sizes and fiber lengths.

If, according to a preferred embodiment, both microcrystalline celluloses and microfine celluloses are contained in the filter layer, then microcrystalline celluloses of particle sizes from 10 to 50 μm., and microfine cellulose with fiber lengths greater than 50 μm. are preferred, and their total shares may amount to as much as 50 weight percent. The individual shares are preferably near 10 to 40 weight percent for the microcrystalline celluloses, and near 10 to 40 weight percent for the microfine celluloses.

The microcrystalline cellulose is of dispersed character so as to be mobile in the layer, similar to kieselguhr, thereby exerting a homogenizing effect. The particle sizes are preferably in the range of from 20 to 30 μm. If the particles are too small, they will clog up the pore system of the cellulose acetate fibers and if too large, they can have no homogenizing effect worth mentioning and will, in part, cause inhomogeneities themselves.

The use of microfine cellulose offers the advantage that the filter material, especially as a depth filter layer, is loosened up, thereby improving the mobility of the microcrystalline cellulose in the matrix material.

The share of cellulose acetate fibers may be as high as 50 weight percent, depending on the desired separation characteristic. The specific cellulose acetate fiber surface is between 5 and 50 square meters per gram, preferably between 5 and 30 square meters per gram. Such cellulose acetate fibers are available, for example, from the Hoechst Celanese Corporation under the name of "Fibret" fibers, which consist of cellulose diacetate with fiber diameters from 0.5 to 5 μm. It is of advantage for the filtration effect if all three components, i.e. the cellulose acetate fibers, the microcrystalline and the microfine cellulose, are present in the filter layer in homogeneous distribution.

As a matrix material, the filter layer contains variously prepared cellulose materials with a share from 10 to 75 weight percent, preferably 10 to 40 weight percent. Variously prepared cellulose is understood to mean unground or little ground celluloses as well as celluloses ground to a degree of greater than 40° SR, preferably greater than 80° SR. While the share of unground or little ground celluloses ranges preferably from 10 to 40 weight percent, the share of ground celluloses can range from 0 to 30 weight percent. The celluloses may have been produced from deciduous trees, needle trees or cotton linters.

Preferably, the filter layer contains additionally a cationic or anionic wet strength agent and/or a cationic or anionic resin, for load adjustment.

According to another preferred embodiment, the use of cellulose acetate fibers can be omitted entirely, if microcrystalline cellulose of particles of a size smaller than 10 μm. are used. This microcrystalline cellulose, in a share from 5 to 50 weight percent, is used together with microcrystalline cellulose of particle sizes from 10 to 50 μm. (10 to 40 weight percent) and, possibly, microfine cellulose (10 to 40 weight percent), with the total share of microfine and microcrystalline cellulose not exceeding 80 weight percent. In this case, the separating effect is determined by the microcrystalline cellulose. The advantage over the first embodiment is that the cost of microcrystalline cellulose is lower than that of cellulose acetate and that, due to the dispersed character of the microcrystalline cellulose, the active substance itself exerts a homogenizing effect so that expansive homogenizing operations become unnecessary.

With depth filter layers consisting of the filter material according to the invention, clearing effects are achieved up to and including the degermination range, and comparable to known kieselguhr layers.

Besides its application for depth filter layers, the filter material of the invention is also applicable for use in pre-coat filters. The advantages of using the cellulose materials as filtering aids are, as in the layers, the low emission of ions composed exclusively of biologically decomposable materials or materials which burn mostly without leaving residues. Due to the use of cellulose acetate fibers or of the microcrystalline celluloses with particle sizes less than 10 μm., a substitute for kieselguhrs is possible. Tests in practical application have shown that rough and medium "guhrs" can be replaced by the settling materials according to the invention. On the other hand, however, cellulose settling materials such as described in DE 41 19 288, are only suited for presettling or as supporting material for additionally required filtering aids such as kieselguhrs and/or perlite.

The manufacturing method is characterized in that the cellulose acetate fibers are first mixed in a wet state with microfine fine cellulose fibers and microcrystalline cellulose, or that the cellulose acetate fibers are mixed in a water-wetted state with microcrystalline cellulose only to form a first slurry. Subsequently, these differently prepared cellulose materials continue to admix and the mash or second slurry formed by this mixing is made into a fleece by a felting method known per se and then dried. In this process, the two fractions of cellulose materials are admixed. The first fraction of the cellulose material is open, and is unground or weakly ground; this is done to assure wet strength. The second fraction is ground after the initial open operation, to form s second slurry being carried out at material concentrations greater than 3 percent by weight, and preferably greater than 4 percent by weight, up to grinding grades which are greater than 40° SR, and preferably greater than 80° SR. This fibrillating grinding operation makes for a low wet density of the layer and thus for a higher particle storage capability.

These method steps solve a problem in that the pore width of the cellulose acetate fiber network is considerably smaller than that of the other components which, together with the small share of cellulose acetate fibers in the layer of less than 50 weight percent leads to an insufficient flow capacity, and thus renders the filter liable to poor or insufficient filtration activity.

Due to the fact that the cellulose acetate fibers and the microcrystalline, and/or microfine cellulose are mixed together intensively at high turbulences, the microcrystalline and the microfine celluloses, or only the microcrystalline cellulose are effectively worked into or merged with the cellulose acetate fiber network. This enables the agglomerates of the cellulose acetate fibers to have improved flow capacity during filtration.

The intermixing can be superposed by a light grinding operation which affects the coarsest component in particular. The subsequent addition of the celluloses cannot interfere with the homogeneity achieved because of the large share of finely divided mix which amounts to as much as 70 to 80 weight percent of the depth filter material. To reverse the process is not advantageous because the relatively coarse cellulose material would rather lead to clumping. To achieve great homogeneity, admixing the microcrystalline and microfine celluloses to the differently prepared celluloses and cellulose acetate fibers must also be very intensive.

The manufacturing methods remain unchanged if no cellulose acetate fibers are used. For example, instead of the cellulose acetate fibers, microcrystalline cellulose of particle sizes smaller than 10 μm. is additionally admixed to the microcrystalline cellulose of particle size greater than 10 μm., and possibly to the microfine cellulose.

Basically, there are two possible ways to produce the dry settling material from the filter material.

In a first embodiment, layers are produced in accordance with the above described method. These layers are fed to a subsequent grinding operation. This grinding operation can preferably be carried out in cutting, pin or ratchet mills.

In a second embodiment, the subsequent grinding operation can be eliminated. No layer subsequently dried on belt driers is formed. Rather, the dispersed cellulose material, after transforming it into a mash and after a predehydration, is immediately fed to a drier. In this procedure, the state of dispersion present in the suspension remains intact so that no further reduction in size is required in the dry state. For drying in accordance with the latter embodiment, drying in the fluid phase, such as spray drying, vortex drying or flow drying proves advantageous. Preferably, the material should enter the drying area through nozzles or turntables.

It is basically also possible to dry mix the individual materials or to rough mix them in the suspension at the site of use. But in both cases the mixing is not as intensive (superposed by a partial crushing) as in the above described procedures.

Other features and advantages will hereinafter appear.

BRIEF DESCRIPTION OF THE FIGURE

In the FIGURE is shown an electronmicroscopic image of a filter layer produced in accordance with the invention. The magnification is 250X.

DESCRIPTION OF THE PREFERRED EMBODIMENTS

EXAMPLES

The filter material was prepared in accordance with the invention in that the cellulose acetate fibers jointly with the microcrystalline and microfine cellulose were admixed and ground intensively. Then they were mixed with the differently prepared celluloses.

The microcrystalline cellulose had a 29 μm. modal value of particle size distribution. The microfine cellulose fibers were between 50 and 100 μm. long. In addition, needle tree celluloses were used.

The layers appearing in Tables 1 to 3 are distinguished by their composition.

Layer 1

This layer consists of only cellulose acetate fibers and cellulose, thus representing a filter layer according to the state of the art (U.S. Pat. No. 5,114,537).

Layer 2

The admixture of 10 Weight percent of microcrystalline cellulose shows a clear improvement of both the permeability and the separating effect.

Layer 3

Increasing the microcrystalline cellulose portion to 20 weight percent again results in an improvement of both permeability and separating effect.

Layer 4

By admixing microfine cellulose the permeability of the layer can be improved greatly without a significant drop in the degree of separation.

Layer 5

By differently preparing the celluloses it is possible to improve the degree of separation further at a tolerable decrease in permeability. The results of the microbiological tests (Table 3) prove in comparison to Layer 1 that is was possible to improve the degermination effect significantly, thereby making the desired replacement of kieselguhr layers in the sterilizing area possible.

Layers 6 and 7

These layers contain no cellulose acetate fibers. In their place, microcrystalline cellulose of particle sizes smaller than 10 μm. are used. The differentiation of the microcrystalline celluloses C and D relates to the particle sizes. The microcrystalline cellulose C represents a cellulose whose particle sizes are in the less than 10 μm. range. Type D has particle sizes preferably in the 10 to 50 μm. range.

TABLE 1a (formulas)

| Layer No. | Cellulose acetate fibers weight % | Microcryst. cellulose weight % | Microfine cellulose weight % | Unground cellulose weight % | Ground cellulose weight % | |
|---|---|---|---|---|---|---|
| 1 | 27.5 | 0 | 0 | 0 | 72.5 | (30° SR) |
| 2 | 27.5 | 10 | 0 | 0 | 62.5 | (30° SR) |
| 3 | 27.5 | 20 | 0 | 0 | 52.5 | (30° SR) |
| 4 | 27.5 | 20 | 20 | 0 | 32.5 | (30° SR) |
| 5 | 30 | 20 | 20 | 15 | 15 | (85° SR) |

TABLE 1b

| Layer No. | Microcrystalline cellulose Type C weight % | Microcrystalline cellulose Type D weight % | Microfine cellulose weight % | Unground cellulose weight % | Ground cellulose weight % |
|---|---|---|---|---|---|
| 6 | 30 | 20 | 20 | 15 | 15 (85° SR) |
| 7 | 40 | 15 | 15 | 15 | 15 (85° SR) |

TABLE 2

Permeability and Clearing Effect Achieved

| Layer No. | Water Permeability at 1 bar in 1 sq. meter/min. | Filtrate turbidity in TE/F | Collection efficiency in % |
|---|---|---|---|
| 1 | 18 | 0.31 | 85.2 |
| 2 | 22 | 0.18 | 91.4 |
| 3 | 39 | 0.11 | 94.8 |
| 4 | 113 | 0.12 | 94.3 |
| 5 | 85 | 0.09 | 95.7 |
| 6 | 78 | 0.13 | 93.8 |
| 7 | 69 | 0.12 | 94.3 |

The differences in the collection efficiency appear not to be great. However, an increase in the collection efficiency by 10% in the cleared filtrate can have great effects on the successful result of the process. Due to the definition of the collection efficiency as the ratio of the particles retained to the particles contained in the original suspension, the changes achieved at degrees of separation greater than 80% are represented only in low numbers. This means that a 10% increase in the collection efficiency represents, for the above mentioned examples, a particle reduction in the filtrate to less than ⅓.

This behavior becomes clear when monodispersed particles (microbiological tests) are used. An LRV difference of 1 means a particle reduction in the filtrate by a power of ten. These data confirm the importance of the present invention.

TABLE 3

Microbiologic Retention

| Layer No. | LRV value for E. Coli | Pseud. dim. |
|---|---|---|
| 1 | 3.20 | 0 |
| 2 | 5.8 | 2.0 |
| 3 | 6.8 | 3.9 |
| 4 | 7.2 | 3.7 |
| 5 | 9.5 | 6.2 |
| 6 | 6.2 | 3.3 |
| 7 | 6.8 | 3.5 |

While the use of microcrystalline cellulose instead of cellulose acetate fibers cannot achieve the results of layers containing cellulose acetate fibers, the distinct increase in separation as compared to the original layer is recognizable.

In the Figure is shown an electronmicroscopic image a filter layer per example layer No. 5. The magnification is 250X.

The homogeneous distribution of the components is clearly visible. In the upper left may be seen a cellulose skeleton fiber 1, embedded homogeneously in the cellulose acetate fibers 2. Fractions of microcrystalline celluloses 3 are embedded in the cellulose acetate fibers and in the cellulose fibers 1. The microfine cellulose bears the reference symbol 4.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A filter comprising a filter layer in the form of a cellulose matrix in which are embedded cellulose acetate fibers and additives, wherein microcrystalline cellulose (3) is incorporated in said filter layer as an additive in an amount of from 10 percent to 70 percent by weight of the entire layer and in that microfine cellulose (4) is incorporated in said filter layer as an additive in an amount of from zero percent to 50 percent by weight of the entire layer.

2. A filter according to claim 1, wherein the microcrystalline cellulose is present in amounts of from 10% to 40% by weight of the filter layer.

3. A filter according to claim 1, wherein the particle sizes of the microcrystalline cellulose (3) are in the range of from 10 to 50 μm.

4. A filter according to claim 3, wherein the particle sizes of the microcrystalline cellulose (3) are in the range of from 20 to 30 μm.

5. A filter according to claim 1, wherein the microcrystalline cellulose (3) has a length-to-diameter ratio of less than 3.

6. A filter according to claim 1, wherein the microfine cellulose (3), when present in an amount greater than zero percents, has fiber lengths of greater than 50 μm.

7. A filter according to claim 6, wherein the microfine cellulose (4) is present in amounts of from 10% to 40% by weight of the filter layer.

8. A filter according to claim 1, wherein the microcrystalline cellulose (3), the microfine cellulose (4), when present in an amount greater than zero percent, and the cellulose acetate fibers (2) are mixed in a homogeneous distribution.

9. A filter according to claim 1, wherein the cellulose acetate fibers are present in amounts of from 5% to 50% by weight of the filter layer.

10. A filter according to claim 1, wherein the microcrystalline and the microfine cellulose (3, 4) jointly are present in amounts less than 50% by weight of the filter layer.

11. A filter comprising a filter layer in the form of a cellulose matrix in which additives are embedded, characterized in that said additives comprise microcrystalline cellulose having particle sizes less than 10 μm. in an amount of from 5 to 50 percent by weight of the entire filter layer, and comprise microcrystalline cellulose having particle sizes of from 10 to 50 μm. in an amount of from 10 to 40 percent by weight of the entire filter layer.

12. A filter according to claim 11, microfine cellulose in an amount of 10 to 40 percent by weight of the entire filter layer is incorporated as an additional additive, the total amount of microcrystalline and microfine cellulose not exceeding 80% by weight of the entire filter layer.

13. A filter comprising a filter layer in the form of a cellulose matrix in which are embedded cellulose acetate fibers and additives, wherein microcrystalline cellulose is incorporated in said filter layer as an additive in an amount of from 10% to 70% by weight of the cellulose matrix.

14. A filter according to claim 1, wherein the microcrystalline cellulose and microfine cellulose, when present in an amount greater than zero percent, are prepared separately, and in that the said celluloses are present in amounts of from 10% to 75% by weight of the filter layer.

15. A filter according to claim 1, matrix is formed from fibers of cellulose which have been ground to various different degrees, and in that the microcrystalline cellulose and the microfine cellulose are present in total amounts of from 10% to 40% by weight of the entire layer.

16. A filter according to claim 1, wherein the microcrystalline cellulose and the microfine cellulose, when present in an amount greater than zero percent, both have unground or slightly ground cellulosic fibres as well as ground particles with grinding degrees of greater than 40° SR.

17. A filter according to claim 16, wherein the grinding degree of the ground cellulosic fibres is higher than 80° SR.

18. A filter according to claim 16, wherein the unground or slightly ground cellulosic fibres are present in amounts of from 10% to 40% by weight of the filter layer, and the ground cellulosic fibres are present in amounts of from 0% to 30% by weight of the filter layer.

19. A filter according to claim 1, wherein the filter layer contains cationic or an anionic wet strength agent.

20. A filter according to claim 1, wherein the cellulose of the matrix is produced from a material selected from the group consisting of the wood of deciduous trees, needle trees and linters.

21. Method for the production of a filter layer according to claim 1, wherein cellulose acetate fibers are first mixed in a water-wetted condition with microfine cellulose and microcrystalline cellulose, or mixed with microcrystalline cellulose only; that subsequently, separately-prepared celluloses are admixed in two steps, the first of which is the preparation of a first slurry of cellulose involving unbeaten or else only weakly beaten particles, and the second step is a beating operation which is performed after the preparation of the said first slurry of cellulose, involving material concentrations greater than 3 percent by weight and preferably greater than 4 percent by weight of the filter layer, up to grinding degrees greater than 40° SR so as to produce a second slurry of fibers, and thereafter said second slurry is formed into a fleece by known felting methods, and subsequently dried.

22. Method according to claim 21, wherein the second step grinds the cellulose fibers of the second slurry up to greater than 80° SR.

23. Method according to claim 21, wherein cationic or anionic wet strength agents are added to the first slurry.

24. Method for the production of a filter layer according to claim 11, wherein microcrystalline cellulose fibers having particle sizes smaller than 10 μm. are first admixed in a water-wetted condition with microcrystalline cellulose fibers having particle sizes smaller than 10 μm. and with microfine cellulose; that subsequently, separately-prepared celluloses are admixed in two steps, the first step of which is the preparation of a first slurry of cellulose involving unbeaten or else only weakly beaten particles, and the second step is a grinding, beating operation which is performed after the preparation of the said first slurry of cellulose, involving material concentrations greater than 3 percent by weight and preferably greater than 4 percent by weight of the filter layer, up to grinding degrees greater than 40° SR so as to produce a second slurry, and thereafter the said second slurry is formed into a fleece by known felting methods, and subsequently dried.

25. Method according to claim 21, wherein the dried fleece is ground up.

26. Method for the production of a filter layer according to claim 1, wherein cellulose acetate fibers are first mixed in a water-wetted condition with microfine cellulose and microcrystalline cellulose, or mixed with microcrystalline cellulose only; that subsequently, separately-prepared celluloses are admixed in two steps, the first of which is the preparation of a first slurry of cellulose involving unbeaten or else only weakly beaten particles, and the second step is a beating operation which is performed after the preparation of the said first slurry of cellulose, involving material concentrations greater than 3 percent by weight and preferably greater than 4 percent by weight of the filter layer, up to grinding degrees greater than 40° SR so as to produce a second slurry of fiber, and thereafter said second slurry is subsequently dried.

27. Method according to claim 26, wherein the drying operation comprises a whirling procedure.

28. A filter comprising a filter layer in the form of a cellulose matrix in which are embedded cellulose acetate fibers and additives, wherein microcrystalline cellulose (3) is incorporated in said filter layer as an additive in an amount of from zero percent to 70 percent by weight of the entire layer and in that microfine cellulose (4) is incorporated in said filter layer as an additive in an amount of from 10 cent to 50 percent by weight of the entire layer.

29. Method for the production of a filter layer according to claim 28, wherein cellulose acetate fibers are first mixed in a water-wetted condition with microfine cellulose and microcrystalline cellulose, when present in amounts greater than zero percent, or mixed with microcrystalline cellulose only, when it is present in amounts greater than zero percent; that subsequently, separately-prepared celluloses are admixed in two fractions, the first of which is the preparation of a first slurry of cellulose involving unbeaten or else only weakly beaten particles, and the second fraction of which is the preparation of cellulose involving a beating operation comprising material concentrations greater than 3 percent by weight and preferably greater than 4 percent by weight of the filter layer, up to grinding degrees greater than 40° SR so as to produce a mash, and thereafter the mash is formed into a fleece by known felting methods, and subsequently dried.

30. A filter according to claim 1, wherein the filter layer contains a cationic or an anionic wet strength agent that is capable of imparting an electric charge to the filter layer.

31. A filter according to claim 1, wherein the microcrystalline cellulose comprises particles having diameters less than 50 µm., and the length to diameter ratio is less than 3; and the microfine cellulose, when present in amounts greater than zero percent, comprises particles having lengths less than 100 µm.

32. A filter according to claim 28, wherein the microcrystalline cellulose, when present in amounts greater than zero percent, comprises particles having diameters less than 50 µm., and the length to diameter ratio is less than 3; and the microfine cellulose comprises particles having lengths less than 100 µm.

33. A filter according to claim 1, wherein the microcrystalline cellulose has a crystallinity index of approximately 0.8, and the microfine cellulose, when present in amounts greater than zero percent, has a crystallinity index of approximately 0.5 to 0.6.

34. A filter according to claim 28, wherein the microcrystalline cellulose, when present in amounts greater than zero percent, has a crystallinity index of approximately 0.8, and the microfine cellulose has a crystallinity index of approximately 0.5 to 0.6.

35. A filter according to claim 1, wherein the cellulose acetate fibers, the microcrystalline cellulose and the microfine cellulose when present in amounts greater than zero percent, are present in the filter layer in a substantially homogeneous distribution.

36. A filter according to claim 28, wherein the cellulose acetate fibers, the microcrystalline cellulose when present in amounts greater than zero percent, and the microfine cellulose are present in the filter layer in a substantially homogeneous distribution with each other.

37. A filter according to claim 13, wherein the cellulose acetate fibers and the microcrystalline cellulose are present in the filter layer in a substantially homogeneous distribution with one another.

* * * * *